United States Patent [19]

Im Han

[11] 4,439,538

[45] Mar. 27, 1984

[54] SUPPORTED CATALYST FOR POLYMERIZING OLEFINS

[75] Inventor: Kyoung R. Im Han, Dobbs Ferry, N.Y.

[73] Assignee: Stauffer Chemical Company, Westport, Conn.

[21] Appl. No.: 422,634

[22] Filed: Sep. 24, 1982

[51] Int. Cl.$^3$ .............................. C08F 4/02; C08F 4/64
[52] U.S. Cl. ...................................... 502/105; 502/113; 526/115
[58] Field of Search ........................ 252/429 B, 429 C

[56] References Cited

U.S. PATENT DOCUMENTS

| | | | |
|---|---|---|---|
| 3,008,945 | 11/1961 | Saltman | 252/429 C X |
| 3,316,314 | 4/1967 | van den Berg | 252/429 C X |
| 4,168,244 | 9/1979 | Throckmorton | 252/429 B |
| 4,321,345 | 3/1982 | Sato et al. | 252/429 B X |

*Primary Examiner*—Patrick Garvin
*Attorney, Agent, or Firm*—Vivienne T. White

[57] ABSTRACT

A novel catalytic system for polymerizing olefins comprises:
(a) a component containing an organometallic compound of Groups I–III of the periodic table, and
(b) a component containing titanium obtained by steps comprising:
treating a ferrous chloride support with at least one organic electron donor to form an adduct.
milling the ferrous chloride, and
post-treating the milled ferrous chloride adduct with a liquid titanium compound containing halogen.

The invention also encompasses the novel catalytic component supported by ferrous chloride, processes for preparing the catalytic component, and the use of the novel catalytic system for polymerizing olefins.

58 Claims, No Drawings

SUPPORTED CATALYST FOR POLYMERIZING OLEFINS

BACKGROUND OF THE INVENTION

This invention relates to a catalytic system for polymerizing olefins, particularly propylene and comonomers. The present invention involves a novel support for catalysts containing titanium, the supported catalysts comprising electron-donor compound and titanium halide, a cocatalyst containing an organometallic compound, a process for producing the supported catalyst, and use of the catalytic system to polymerize olefins by the coordinate complex (Ziegler-Natta) method.

The coordinate complex approach to polymerizing olefins has been known for 30 years, and thousands of catalytic systems involving that approach have been disclosed. The present invention is a novel and useful catalyst for polymerizing olefins with high activity and stereospecific control.

Activity is normally measured by the grams of polyolefin produced per gram of catalyst containing titanium or other transition metal. High activity leads to a low amount of metallic ash and corrosive halide left in the polymer. If the activity is high enough, e.g., 10,000, then the de-ashing step in processing the final polyolefin can be omitted—an important improvement.

For olefins such as propylene which can form isotactic structures, high isotacticity (stereospecificity) (up to about 97 percent) gives better physical properties to the polymer. Isotactic polypropylene is more ordered, less soluble in halocarbons or hydrocarbons, and useful for its higher strength than the more soluble atactic form. Isotactic indices (defined below) of 93 or higher are favored for commercial polypropylene.

U.S. Pat. No. 3,238,146 granted to Hewett and Shokal discloses a polymerization catalyst for olefins comprising crystals of salts of a metal with an atomic weight between 24 and 209 vacuum-plated with a molecularly thin layer of salts of dissimilar metals. Preferred substrate salts are rhombohedral such as cobaltous, magnesium, manganese, and cadmium dichlorides. Preferred coatings, 10 to 100 molecules thick, are halides of metals with atomic volumes between 5 and 15 such as titanium, vanadium, and zirconium.

U.S. Pat. No. 3,008,945 discloses a catalyst system for polymerizing isoprene with stereochemical control comprising an aluminum alkyl, titanium tetrachloride, and ferric chloride.

U.S. Pat. No. 2,954,367 discloses a slurry for polymerizing vinyl compounds comprising the reaction product of a halogen-free organometallic compound with compounds of metals from Groups IVB, VB, VIB or VIII of the periodic table of the elements.

U.S. Pat. No. 4,048,418 discloses a catalyst system for polymerizing dienes comprising an organometallic reducing agent from Groups I and III of the periodic table, a ligand containing nitrogen and a compound containing iron such as ferric salts of organic acids, $FeCl_3$, or $FeCl_2$.

All four of the disclosures cited above are incorporated by reference into this application.

OBJECT OF THE INVENTION

It is an object of this invention to prepare a coordinate complex catalytic system for polymerizing olefins, alone or as mixtures, to polymers of high stereoregularity. Other objects of the invention will be apparent to those skilled in the art.

SUMMARY OF THE INVENTION

Surprisingly, good catalytic activity and high isotactic index (II) can be achieved by employing the novel catalyst of the present invention for polymerizing olefins, especially propylene. The novel catalytic system comprises:
  (a) a component containing an organometallic compound of Groups I—III of the periodic table, and
  (b) a component containing titanium obtained by steps comprising:
     treating a ferrous chloride support with at least one organic electron donor to form an adduct,
     milling the ferrous chloride support to activate it,
     post-treating the activated ferrous chloride adduct with a liquid titanium compound containing halogen.

Furthermore, an aspect of the present invention is a novel component containing titanium halide and a process for producing the novel component.

Another aspect of the present invention is a process for employing the novel catalytic system to polymerize propylene, ethylene, their mixtures, other olefins, or mixtures of olefins.

DETAILED DESCRIPTION OF THE INVENTION

The present invention is broadly applicable to the the polymerization of monomeric olefins including 1-olefins such as ethylene and propylene, dienes, especially conjugated dienes such as butadiene, and those other olefins which are only polymerized with difficulty, such as 2-butene. The preferred monomeric olefins are those corresponding to the formula $R\text{-}CH=CH_2$, wherein R is an alkyl radical containing up to 12 carbon atoms inclusive and hydrogen. Among the preferred monomeric olefins are ethylene, propylene, 1-butene, 1,4-butadiene, 1-pentene, 4-methyl-1 pentene, 1-hexene, and the like. These monomers may be employed individually or in comonomeric mixtures such as ethylene/propylene, ethylene/propylene/butadiene, and the like. The term "monomeric olefin" means those olefins which can undergo addition polymerization alone or with comonomers.

Although for illustrating the present invention, the polymerization of propylene is described herein as an example, the invention is by no means limited to any one monomeric olefin.

The organometallic compound for component (a), the cocatalyst, may be an organometallic compound known to those skilled in the art of coordinate complex polymerization as useful. Included are organocompounds of zinc, mercury, magnesium, cadmium, boron, gallium and other metals of Groups IA, IIA, and IIIA of the periodic table of the elements. The preferred organometallic compounds are those of aluminum, especially trialkylaluminums.

The organoaluminum compound preferred for use as a cocatalyst may be selected from the following compounds: trialkyl aluminums such as triethylaluminum, triisobutylaluminum, and trihexylaluminum, dialkyl aluminum halides such as diethylaluminum chloride, diethylaluminum bromide, and dibutylaluminum chloride, alkylaluminum sesquihalides such as ethylaluminum sesquichloride, alkylaluminum dihalides such as ethylaluminum dichloride, ethylaluminum difluoride, and butylaluminum dichloride, and dialkylaluminum alkoxides such as diethylaluminum ethoxide, diethylaluminum butoxide, and diethylaluminum phenoxide.

The molar ratio of trialkylaluminum or other cocatalyst to the novel catalyst of the present invention may range from about 1000:1 to about 1:1, preferably about 200:1 to about 5:1 (titanium basis).

An electron donor may be employed in the cocatalyst component with the organometallic compound. Electron donors (Lewis bases) are organic compounds containing O, N, S, or P moities which share electron-pairs with the cocatalyst (Lewis acid) and do not interfere with the polymerization. Oxygen compounds are preferred donors especially alkyl esters of aromatic carboxylic esters. Methyl toluate, ethyl anisate, ethyl benzoate, and dibutyl phthalate, are examples of such preferred electron donors (Lewis bases) for the cocatalyst component.

The electron donor employed in conjunction with the cocatalyst may be advantageously used in a molar ratio from about 1:10 to about 1:1 with respect to the cocatalyst (e.g., trialkylaluminum).

The ferrous chloride support of the present invention may be commercial material or it may be prepared in situ by the reduction of ferric chloride with a reducing agent such as an alkylaluminum compound. It is preferable that the ferrous chloride support material be dried to the level of about one percent moisture or less before use in the present invention. Drying may be accomplished by heating in an oven at 200° to 400° C., preferably under vacuum.

Another means of drying is by treatment with an organic liquid which forms an azeotropic mixture with water. If the pretreating organic liquid is an electron donor (Lewis base) e.g., butanol, then two steps are accomplished in the same operation: drying and adduct formation. Alternatively, a hydrocarbon such as benzene or toluene may be used to carry out the azeotropic drying by distillation without formation of an electron-donor adduct with the ferrous chloride. Furthermore, the ferrous chloride may be pretreated with a mixture of two or more organic compounds simultaneously; one to form an azeotropic mixture with water (e.g., toluene), the other to form an adduct (e.g., ethyl benzoate) at the same time as drying by azeotropic distillation.

Two steps are involved in the preparation of the ferrous chloride support material of the present invention after pretreatment by thermal drying and/or azeotropic distillation: activation and treatment with one or more electron donors to form an adduct. As already mentioned, treatment with an electron donor can be part of the drying process if the electron donor forms an azeotropic mixture with water (e.g., alcohol, ether, carboxylic ester, ketone, aldehyde, pyridine). Treatment with an electron donor may take place as a separate step unrelated to drying by warming or boiling the dry ferrous chloride support in the electron-donor liquid for about ten minutes to about an hour or more. Alternatively, formation of an electron-donor adduct may take place at the same time as activation by copulverizing the ferrous chloride in a mill with a liquid or solid electron donor. Finally formation of the electron-donor adduct may take place after activation by milling, or a combination of the three possible alternatives may be employed.

It is particularly advantageous to employ as one of the electron donors an organic polymer containing silicon (e.g., a silicone oil) during activation by milling, since such a polymer functions as a pulverization aid as well as an electron donor. Other pulverization aids are liquid or polymeric hydrocarbons such as heptane, polyethylene, or polystyrene.

Activation can be carried out by dissolving the ferrous chloride support and its electron donors followed by reprecipitation. Also a finely divided ferrous chloride support can be generated in situ by chemical reaction, such as the reaction of an organometallic diethyl aluminum chloride reagent with ferric chloride in a hydrocarbon to yield ferrous chloride in finely divided form. The much preferred means for activation, however, is copulverization (milling, grinding) of the support.

The copulverization may be carried out in any suitable milling equipment such as a ball mill, a hammer mill, a vibratory mill, a grinding mill, or the like. Use of a ball mill is preferred, especially employing stainless steel balls, but ceramic, glass, or balls of other material may be used.

It is preferable to premill (prepulverize) the ferrous chloride support after drying and before the addition of any electron-donors, but this is not essential to the practice of the present invention. Premilling serves to increase the surface area of the support material and develop fresh sites for interaction with the electron-donors. A suitable premilling or milling time is from one-quarter to ten days. The amount and size of the balls used for pulverization can vary within wide ranges. The weight of the balls compared to the weight of the support material charged to the mill will vary depending on the density of the balls. A suitable range would be about equal weight for ceramic and glass balls to about 50 times the weight of the charge for stainless steel balls. The size of the balls can vary, preferably from about 3 mm to about 50 mm.

If an organic polymer containing silicon is employed during the milling, it is preferably added first, as it may serve as a pulverization aid as well as a donor. The preferred polymer containing silicon is a linear polysiloxane, commercially known as silicone oil, with the chemical formula

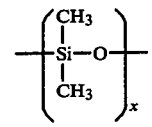

The molecular weight of silicone oils advantageously used in this invention can range from about 300 to about 150,000. The amount of silicone oil (polysiloxane) employed can range from about three percent of the weight of the support to about 30 percent of the weight of the support. About 10-20 percent by weight of the support material is a preferred amount of polysiloxane or other organic polymer containing silicon.

If an electron-donor adduct is formed by way of pretreatment, with or without the azeotropic drying mechanism, from about equal to about 20 times the weight of ferrous chloride is employed for the electron-donor. If a polymer containing silicon or other pulverization aid is employed in the pulverization stage, from about 3 to about 30 percent of the weight of ferrous chloride of pulverization aid is used. If an electron-donor adduct is formed by copulverization of a liquid or solid electron donor with the ferrous chloride support, from about 10 to about 200 percent by weight of the ferrous chloride is employed for the electron-donor. If an electron-donor adduct is prepared by intimate contact between the electron donor and ferrous chloride after activation of the support, from about 10 percent to about 200 percent of the ferrous chloride weight is employed for the electron donor.

The preferred electron donor compound is an aromatic carboxylic ester such as ethyl benzoate. The carboxylic ester may be in the form of a liquid or a solid or a solid complex with a transition metal halide, such as $TiCl_4$, that is ethyl benzoate.$TiCl_4$ complex. It is advantageous to employ a complex of a titanium halide because the post-treatment step employs such a compound. Many other electron donors may be employed alone or in mixtures.

The electron-donor of the present invention is an organic compound containing oxygen, phosphorus, nitrogen, or sulfur. Often the electron donor is termed a Lewis base. A mixture of more than one electron donor may be employed.

Among the classes of compounds containing oxygen suitable for furnishing electron-donors are: aliphatic and aromatic ethers, aliphatic carboxylic esters, aromatic carboxylic esters, cyclic esters of carbonic acid, alcohols, aldehydes, ketones, aliphatic and aromatic carboxylic acids, lactones, and carboxylic acyl halides.

Among the classes of compounds containing nitrogen suitable for furnishing electron-donor are: aliphatic amines and polyamines, aromatic amines, heterocyclic amines, nitriles, carbamates, aromatic isocyanates, and aromatic azo compounds. Electron-donors containing both oxygen and nitrogen atoms may be used such as aliphatic and aromatic amides, nitrocompounds, or guanidine and its alkyl-substituted derivatives.

Other classes of electron-donors include phosphines, phosphoramides, sulfides, mercaptans, thioethers, thioesters, organosilicon isocyanates, and polysilazines.

Examples of electron-donor compounds from some of the classes listed above are: ethyl benzoate, ethyl anisate, ethyl toluate, ethyl acetate, diethyl carbonate, γ-butyrolactone, acetone, acetophenone, nitrobenzene, veratrol, tetramethylenediamine, dimethyl acetamide, methyl carbamate, toluene diisocyanate, benzonitrile, N-methyl pyrrolidone, and thiophenol.

If the electron-donor adduct of ferrous chloride is prepared by copulverization the milling time may vary from about one hour to about 20 days. Depending on the size of the milling equipment, the number size, and weight of the balls, and the ambient weather, the copulverization step will be run from about 10° C. to about 50° C. The ferrous chloride and one or more electron donors may be added to the charge in the mill in increments or all at once in any order. The activation by milling may be carried out continuously or in stages. The exact order of addition of the donors and the exact length of time each is milled is not critical to carrying out the preparation of the catalyst of the present invention.

It is advantageous to perform premilling and copulverization operations in an inert atmosphere in order to minimize the effect of water and oxygen on the catalyst. Nitrogen, argon, helium or other inert gases may be employed. The catalyst should always be handled and stored in an inert atmosphere.

A necessary step in the process for preparing the novel ferrous chloride-supported catalyst of the present invention is reacting the copulverized adduct of one or more electron donors with a source of tetravalent titanium ion. This post-treatment is necessary even if in the course of activation $TiCl_4$ itself or an electron-donor complex of $TiCl_4$ has been employed. Titanium chloride is the preferred reagent, either neat or in solution, but titanium tetrabromide, a mixed halide, or a mixed alkoxy halogenide may be employed as long as it is tetravalent.

The post-treatment may be carried out in a liquid titanium tetravalent halogenide neat, or moderated by the presence of an alkane or aromatic hydrocarbon, halocarbon, or other non-interfering solvents. Examples of the latter are benzonitrile, ethyl acetate, or diphenyl ether, but toluene is preferred. Chlorobenzene may also be employed. One advantage derived from the use of solvents along with the titanium halide reagent is solution of any interfering side-products which might form from reaction with the electron donors.

The temperature of the post-treatment reaction can range from about 60° C. to 145° C. or to boiling point of the titanium tetrahalide or titanium alkoxyhalide; e.g., $TiCl_4$ 136° C.; $TiBr_4$ 230° C. A temperature range from about 80° to about 120° C. is preferred, whether or not a solvent is employed. Lower temperatures of reaction can be compensated for by longer reaction times. For the preferred temperature of 80°–120° C., a reaction time of about two to about five hours is preferred. If the preferred $TiCl_4$ is employed neat at its boiling point, then one to two hours suffices. In the range of about 80° to about 90° C., about two to three hours of reaction time is favored.

The preferred weight of $TiCl_4$ or other tetravalent titanium halide employed for the post-copulverization reaction should approximate the weight of the copulverized solid to be treated. The amount of tetravalent transition metal halide may vary from 0.5 to 500 the weight of solid being treated. When a solvent is employed, its weight can range from about one-half to about ten times that of the titanium tetravalent halide reagent being used.

After the post-treatment step is completed, the catalytic product should be separated in an inert atmosphere from the reaction mixture by any suitable method such as decantation, filtration, cycloning, or centrifugation and washed with an inert solvent, such as a hydrocarbon, until the washings are free of halogen. The washed precipitate may then be vacuum-dried, sieved, and stored in an inert atmosphere.

Surprisingly, it has been found that it is advantageous to treat the novel ferrous chloride-supported titanium catalyst of the present invention with warm inert hydrocarbon liquid, as an additional step, at any point in the preparative procedure described above. By "warm" a temperature from about 40° C. to about 100° C. is intended. By "inert" is meant an organic medium essentially incapable of chemical reactivity with ferrous chloride or titanium chloride. Suitable examples of inert, liquid media are alkanes, aromatic hydrocarbons, and halogen-substituted aliphatic or aromatic hydrocarbons. Specific examples of such liquids are heptane, toluene, chlorobenzene, and carbon tetrachloride.

The exact effect this additional treating step has on the novel catalyst of the present invention is not known. Some postulated benefits are solubilization of impurities, ripening of the catalyst, or improved filterability. The additional treating step may be carried out after drying the ferrous chloride, after copulverization, after post-treatment with a tetravalent liquid containing titanium, or any combination of these times. From about 20 minutes to about four hours or more has been found to be advantageous.

Morphologically, the post-treatment/extraction step greatly increases the surface area of the ferrous chloride support and tends to make it microporous. The initial ferrous chloride normally has a surface area in the range of about 1 m²/g. Intensive milling increases the surface area to the range of about 10 m²/g. The post-treatment/extraction step, as illustrated by the significant weight loss in the Examples, opens up the microstructure thus enabling the tetravalent titanium moiety to permeate the support. The final catalyst component has a surface area in the general range of about 100 m²/g.

The typical preferred amount of titanium in the catalyst component is from about 2 to about 5 weight percent, but from about 1 to about 15 weight percent titanium may be catalytically useful.

The novel component containing titanium and supported on ferrous chloride is air and moisture sensitive. Thus during preparation, storage, and use it should be kept in an inert atmosphere (e.g., nitrogen, argon) containing less than 5 ppm oxygen and less than 5 ppm moisture. The preferred electron donors for the cocatalysts for the polymerization, methyl toluate or ethyl anisate, are hydroscopic and should also be handled in a moisture-free environment. All reagents should be of polymerization grade.

The description of the present invention is illustrated but not limited by the following Examples, which may be varied in numerous secondary ways, while still remaining within the scope of this disclosure.

EXAMPLE 1

This Example illustrates preparation of the titanium tetrachloride.ethyl benzoate complex often used in the preparation of the catalyst of the present invention.

A 3-liter (L) three-necked flask was equipped with a gas inlet valve, a mechanical stirrer to drive a Teflon paddle, and a 250-ml pressure equalizing dropping funnel. To this flask was added 1.5 L heptane (Phillips 99.9%) and 190 ml (1.73 mol) distilled TiCl₄ under rapid stirring followed by the slow addition of 245 ml (1.72 mol) ethyl benzoate (Aldrich 99+%) during a one-hour period. A yellow precipitate of the complex formed immediately. The mixture was stirred for two hours at ambient conditions. After transfer of the flask to a Vacuum Atmospheres Co. glove box under nitrogen, the mixture was filtered, washed with two liters heptane, and vacuum dried for about 17 hours. The yield approached theoretical.

EXAMPLE 2

This Example illustrates the slurry polymerization of an olefin (propylene) in a solvent (heptane) employing the novel catalyst of this invention.

A 4.5-L reactor containing 2 L heptane stirred at 600 rpm was used to carry out a polymerization for 1.5 hours at 65° C. with the reactants added in the following order: 12 mmole triethylaluminum, 0.54 g methyl p-toluate, 100 mg catalyst component of Example 3, 3.2 psi (about 1/5 atmosphere) hydrogen moderator, and propylene maintained at 10 atm pressure.

After 1.5 hr. the reaction was quenched and the product was washed, and vacuum-dried. The catalyst component showed an activity of 3666 g polymer/g catalyst component, II 92.5.

Catalytic activity is calculated as (g PP/g cat.):

$$\frac{\text{dried polymer plus heptane-soluble polymer}}{\text{titanium component}}$$

Isotactic Index (II) is calculated as: the fraction of total polymer insoluble in boiling heptane for three hours (termed C₇) multiplied by the amount of dried, isolated polymer, multiplied by 100 and divided by total polymer produced, that is:

$$II = \frac{C_7 \times \text{dry polymer}}{\text{total polymer}} \times 100$$

EXAMPLE 3

This Example illustrates use of the novel catalyst of the present invention to polymerize propylene to produce a stereospecific polymer in good yield. This Example also illustrates the efficacy of the extra heat-treating step in hydrocarbon.

The support for the catalyst was prepared by preheating 48.5 g FeCl₂ (Alfa Div., Ventron Corp.) with 110 g n-butanol and 10 ml ethyl benzoate at reflux for three hours to remove any water by azeotropic distillation. The brown suspension then passed through a K&K medium filter with a coarse frit. The solvent was removed by heating under reduced pressure first at 80° C. for five hours, then at 105° C. for three hours.

Then 21 g of this FeCl₂.BuOH.EthBz light tan powder was charged into a 7 L jar mill (Paul Abbe) with 7 g of the EthBz.TiCl₄ yellow solid complex prepared in Example 1 and milled for four days with 1750 g 1.6-cm diameter stainless steel balls at 50 rpm and ambient temperature. Dark tan copulverizate was collected in the amount of 16 g, sieved through a 10-mesh sieve, and stored under nitrogen.

A 4.03 g aliquot of copulverizate was then heat-treated for 40 minutes in about 100 ml toluene at reflux. The supernatant toluene was removed by cannula, leaving about 5 ml toluene, and 40 ml neat TiCl₄ was added. Post-treatment/extraction of the catalyst was carried in TiCl₄ at about 95° C. for 3.5 hours.

The solid was filtered, washed with heptane three times, vacuum-dried, and sieved with a standard 140 sieve, yielding 2.37 g of a light green catalyst. Employing the standard slurry procedure of Example 2 with the use of 12 mmole triethylaluminum and 3 mmole methyl p-toluate this catalyst was characterized by showing a catalytic activity of 3666 g polypropylene per g catalyst with an isotactic index of 92.5.

Upon rerunning a week later, the characterization was 1271/88.7 and three more days later 701/92.6. At that point another aliquot showed characterizing values of 1110/88.8 for activity and II.

This sample showed the following elemental analysis: Cl-53.2%, Fe-30.3%, Ti-3.5%.

EXAMPLE 4

This Example illustrates the effect of the ratio of cocatalyst to cocatalyst electron donor while employing the novel catalyst of the instant invention supported on ferrous chloride.

A 14.22-g aliquot of the FeCl₂.BuOH.EthBz complex prepared in Example 3 was milled with 4.5 g of the EthBz.TiCl₄ prepared in Example 1 and 1750 g of the same stainless steel balls as in Example 3 for five days. A light brown powder weighing 13.5 g was scraped from the mills and separated from the balls with a No. 10 standard sieve.

An aliquot of 4.91 copulverizate was treated in 100 ml toluene at reflux for one hour, filtered hot, washed with 100 g toluene, and vacuum-dried yielding 3.65 g of a dark violet powder.

Then 3.21 g of this treated copulverizate was heated for three hours at about 95° C. in 38 ml neat $TiCl_4$, filtered, washed three times with heptane, and vacuum-dried. The yield was 2.66 g of grey powder, which was stored in two vials identified as R and B.

Employing the standard slurry polymerization of propylene, described in Example 2, to characterize the catalyst with a triethylaluminum/methyl p-toluate ratio of 12 mmole/3 mmole for the R sample gave results of activity 795 g/g and I.I. of 85.5. Upon repetition the results were 831/87.2.

The B sample at a ratio of 12:3 mmole gave results of 937/85.1 at first. Then four more standard slurry polymerizations were separately carried out by the procedure of Example 2 at different ratios of triethylaluminum (TEAL) to methyl p-toluate (MPT) (mmoles) with the following results:

| Ratio TEAL/MPT, mmoles | Activity g PP/g cat/II |
|---|---|
| 6:3 | 1350/88.7 |
| 9:3 | 1006/85.5 |
| 12:3 | 1162/86.2 |
|  | 937/85.1 |
| 18:3 | 701/83.0 |

It is seen that the 6:3 ratio of cocatalyst to cocatalyst electron-donor is slightly superior to the others.

EXAMPLE 5

This Example illustrates the procedure of performing the post-treatment/extraction step in neat $TiCl_4$.

A sample of brown $FeCl_2$ (Alfa. Div., Ventron Corp.) weighing 30.4 g was pretreated with 5 ml ethyl benzoate, evacuated under vacuum, treated with 150 ml degassed n-butanol, and heated to reflux for 2½ hours. The brown solid was separated by filtration and dried under vacuum at 130° to yield 32.5 g.

The 32.5 g of $FeCl_2.EthBz.BuOH$ was milled in a 7 L ball mill with 10.7 g $EthBz.TiCl_4$, prepared as in Example 1, and 1750 g steel balls, as in Example 3, for five days, screened with a 30-mesh sieve, yielding 31.79 g of a dark green powder.

An aliquot of 8.2 g of copulverizate adduct was then treated for one hour in 85 ml toluene at reflux, filtered, washed with toluene, and vacuum-dried.

The treated, copulverizate adduct was then post-treated in 90 ml $TiCl_4$ at about 100° C. for one hour, filtered, washed three times with heptane, and vacuum-dried, yielding 5.52 g of dark green catalyst powder.

By the method of Example 2 a standard slurry polymerization with propylene was run at three different ratios of triethylaluminum (TEAL) to methyl p-toluate (MPT) in mmoles with the following results of catalytic activity for the dark green catalyst powder and isotactic index (II) for the polypropylene produced:

| TEAL/MPT mmoles | Activity g/g/II |
|---|---|
| 11:3 | 487/76 |
| 12:3 | 491/79.7 |
| 13:3 | 514/77.5 |

EXAMPLE 6

This Example illustrates the use of a catalyst supported on ferrous chloride, prepared in situ by reduction of ferric chloride, which has not been milled.

A sample of 3.07 g ferric chloride (98% anhydrous, Ventron Corp.) was dried under vacuum while being heated with a laboratory 7.6-cm, 1350-watt, heat gun. The color changed from brown-black to yellow-red. The powder was treated with 10 ml diethylaluminum chloride (25% in heptane) for two hours at ambient temperature. Some heptane was removed and then some $TiCl_4.MgCl_2.THF$ (tetrahydrofuran) complex solution was added cold at less than 10° C. with stirring at room temperature. A yellow precipitate formed, which was first vacuum-dried then heated at 95° C. under vacuum for two hours to yield 4.46 g yellow powder.

This yellow powder was treated in 50 ml toluene at 90° C. for one hour, allowed to settle, the supernatant removed by cannula, and then treated with 30 ml $TiCl_4$ heat at 95° C. for two hours, followed by one hour at 125° C. The dark green precipitate was washed with toluene once, heptane three times, dried and sieved.

Slurry polymerization of propylene using this catalyst with the procedure of Example 2 gave 1648 g polymer per g catalyst showing an isotactic index of 79.4.

EXAMPLE 7

This Example illustrates another embodiment of the invention.

A 54.36 g sample of brown $FeCl_2$ (Alfa. Div., Ventron Corp.) was dried by heating at about 120° C. under vacuum for one day, yielding 53.86 g. A 15 g aliquot was milled, as in Example 3, with 5.1 g of $EthBz.TiCl_4$, prepared as in Example 1 for four days and sieved thru a 10-mesh screen. The green product weighed 16.57 g.

A 10.5-g aliquot was treated at reflux in 150 ml toluene for one hour, allowed to settle, and separated at room temperature by decantation. The green powder was then treated in 100 ml $TiCl_4$ at 105° C. for two hours and cooled to ambient. One portion was filtered, washed three times with heptane, and vacuum dried. This is sample 7A.

Another portion of the post-treated/extracted catalyst, sample 7B was further treated in the neat $TiCl_4$ at about 100° for two additional hours, filtered hot, washed three times with heptane, and vacuum dried.

Samples 7A and 7B were tested as in Example 2, in the standard slurry polymerization of propylene at different ratios of donor with the following results for catalytic activity and isotactic index:

| Example | Ratio TEAL/MPT (mmole) | Activity g PP/g cat./II | |
|---|---|---|---|
| 7A | 9:3 | 771 | 74.7 |
| 7B | 6:3 | 623 | 79.8 |

EXAMPLE 8

This Example illustrates the use of chlorobenzene as a pretreatment medium.

A sample of brown 50.12 g $FeCl_2$ (Alfa. Div., Ventron Corp.) was treated at reflux in 100 ml degassed chlorobeneze for 1½ hours, filtered, washed with toluene, filtered, and dried under nitrogen to yield 48.80 g of light orange product.

A 20 g aliquot was ground in a ball mill for four days, as in Example 3, with 6.8 g EthBz.TiCl$_4$, prepared as in Example 1, and screened with a 30-mesh sieve to yield 23.5 g of green powder.

A 10-g sample of the copulverizate was pretreated with 150 ml toluene at reflux for one hour, cooled, and separated by decantation after settling. Then 30 ml TiCl$_4$ was added to the wet solid for treatment at 100° C. for two hours. Sample A was separated by filtration, washed three times with heptane, vacuum-dried, and sieved through a 140-mesh screen to yield 2.75 g of a dark green solid.

The remaining slurry, sample, was treated at about 100° C. in the TiCl$_4$ for an additional 1½ hours, filtered hot, washed with heptane three times, and vacuum-dried to yield 4.93 g of dark green solid.

Three runs were carried out as in Example 2 to test these two samples in the standard slurry test for propylene polymerization with different ratios of triethylaluminum to methyl p-toluate with the following results:

| Example | Ratio TEAL/MPT (mmoles) | Activity p PP/g Cat. |
|---|---|---|
| 8A | 6:3 | less than 200 |
| 8B | 6:3 | no polymer |
| 8B | 12:3 | 492 |

EXAMPLE 9

This Example illustrates the use of tetraethyl orthosilicate as an electron donor for the novel catalyst component of the present invention along with a reducing agent.

A 20-g sample of oven dried FeCl$_2$ (Alfa-Ventron) was milled, as in Example 2, for five days. Then 2 ml tetraethyl silicate and 5 g EthBz.TiCl$_4$, prepared as in Example 1, were added to the charge, which was further milled for five days and sieved through a 10-mesh screen to yield 22.1 g of green powder.

To a 10-g aliquot of this powder was added 50 ml heptane with cooling to below 0° C. Then 20 ml of 25 percent diethylaluminum chloride in toluene (Aldrich Co.) was added slowly with warming to about 10° C. After two hours this green slurry was heated to about 60° C., whereupon it became purple-brown. After an additional two hours at about 55° C. it was allowed to cool. The slurry was allowed to settle, the liquid removed by decantation, and the solid washed three times with heptane. At this point 40 ml TiCl$_4$ was added and the powder treated at about 100° C. for two hours whereupon it was filtered from the liquid, washed three times with heptane, vacuum-dried, and passed through a 140-mesh screen to yield 10.14 g of a purple powder.

A standard slurry polymerization of propylene was run employing this material as a catalyst with a TEAL/MPT ratio of 12 mmole to 3 mmole. The catalytic activity was 1079 g polypropylene per g catalyst with an isotactic index of 69.2.

EXAMPLE 10

This Example illustrates the use of butanol as a donor along with a reducing agent in the preparation of the novel catalyst component of the present invention.

A 150-g sample of FeCl$_2$ (Alfa-Ventron) was dried and activated by azeotropic distillation in 300 ml of n-butanol. The solid was then dried by heating for 16 hours at about 300° C., followed by vacuum drying for three hours at about 135° C.

Then 75 g was milled for two days, as in Example 3. At this point 20 g of FeCl$_2$ was separated and 2 ml of silicone oil (GE 96-100) and 2 ml ethyl benzoate were added to this fraction for three more days of milling. After sieving through a 30-mesh screen the sample weighed 22.57 g.

To a 10.3-g aliquot was added 50 ml heptane with cooling to below 0° C. Then 20 ml of 25 percent diethylaluminum chloride in toluene (Aldrich Co.) was slowly added and the temperature allowed to rise to about 10° C. for two hours. Then the solution was warmed to about 60° C. for two hours, and the reaction mixture brought to ambient conditions. After 16 hours the liquid was decanted, the solid washed with heptane three times, and 40 ml TiCl$_4$ added. This reaction mixture was held at 100° C. for two hours, filtered, washed with heptane three times, vacuum-dried for two hours, and sieved through a 140-mesh screen to yield 10.1 g of a brown powder.

As in Example 2, a standard slurry polymerization of propylene was run to characterize the catalyst. The catalytic activity was 1113 g PP/g catalyst with an II of 65.8.

EXAMPLE 11

This Example illustrates the simultaneous drying and formation of an adduct with the support material of the present invention.

To 38.6 g of FeCl$_2$ (Aldrich, anhydrous) were added 150 ml degassed n-butanol and 10 ml distilled ethyl benzoate. Azeotropic distillation was carried out at reflux for two hours with about 50 ml of butanol taken off. The remaining solvent was taken off under reduced pressure in a rotary evaporator, whereupon the damp solid was heated at 80° C. for 1½ hours, 95° one hour, and 110° C. for two hours.

A 21-g aliquot was then milled with 7 g EthBz.TiCl$_4$ complex for three days and sieved with a 10-mesh screen to yield 16.0 g of a brown powder.

An 8-g sample was then treated at 100° with toluene for one hour, decanted, and reacted with 80 ml TiCl$_4$ at about 105° C. for two hours, allowed to cool for 16 hours, and further reacted at 110° C. for one hour. The green solid was filtered, washed with 70 ml heptane three times, vacuum dried for two hours, and sieved through a 140-mesh screen to yield 5.32 g.

A sample of this catalyst was characterized by the standard slurry polymerization, as in Example 2, and showed an activity of 868 g PP/g catalyst and an isotactic index of 63.

The foregoing Examples illustrate but do not limit the scope of the present invention. Those skilled in the art may practice various alternatives which would nevertheless be encompassed by the claims. We seek legal protection by letters patent, as follows.

I claim:

1. A catalytic system for polymerizing olefins comprising:
    (a) a component containing an organometallic compound of Groups I–III of the periodic table, and
    (b) a component containing titanium obtained by steps comprising:
        treating a ferrous chloride support with at least one organic electron donor to form an adduct,
        milling the ferrous chloride, and
        post-treating the milled ferrous chloride adduct with a liquid titanium compound containing halogen.

2. A catalytic system as in claim 1 wherein the component containing titanium is obtained by the additional step of treating the ferrous chloride support with a hydrocarbon solvent.

3. A catalytic system as in claim 1 wherein the component containing titanium is obtained by carrying out, at least in part simultaneously, the steps of treating a ferrous chloride support with at least one organic electron donor and milling.

4. The catalytic system of claim 1 wherein the ferrous chloride support is obtained by reducing ferric chloride.

5. The catalytic system of claim 1 wherein the ferrous chloride support is substantially anhydrous.

6. The catalytic system of claim 1 wherein the organic electron donor is in the form of a complex with a titanium compound containing halogen.

7. The catalytic system of claims 1 or 6 wherein the electron donor is an aromatic carboxylic ester.

8. The catalytic system of claim 1 wherein the milling is carried out in the presence of a pulverization aid.

9. The catalytic system of claim 8 wherein the pulverization aid is a polysiloxane.

10. The catalytic system of claim 1 wherein the organometallic compound is an organoaluminum compound.

11. The catalytic system of claim 4 wherein the reducing agent for reducing ferric chloride to ferrous chloride is an organoaluminum compound.

12. The catalytic system of claim 1 wherein one of the electron donors is an alcohol.

13. The catalytic system of claim 1 wherein one of the electron donors is ethyl benzoate and another is butanol.

14. The catalytic system of claim 1 wherein the liquid titanium compound containing halogen of the post-treatment step is titanium tetrachloride.

15. The catalytic system of claim 1 wherein the post-treatment step is carried out in the presence of an inert hydrocarbon or halohydrocarbon solvent.

16. The catalytic system of claim 15 wherein the inert hydrocarbon or halohydrocarbon solvent contains a compound selected from the group consisting of benzene, toluene, xylene, chlorobenzene, or their mixtures.

17. The catalytic system of claim 1 or 2 wherein the post-treatment step is carried out at a temperature from about 60° C. to about 145° C.

18. The catalytic system of claims 1 or 2 or 3 wherein the milling step is carried out in two or more stages.

19. A component containing titanium of a catalytic system for polymerizing olefins obtained by steps comprising:
treating a ferrous chloride support with at least one organic electron donor to form an adduct,
milling the ferrous chloride, and
post-treating the milled ferrous chloride adduct with a liquid titanium compound containing halogen.

20. A component as in claim 19 wherein the component is obtained by the additional step of treating the ferrous chloride support with a hydrocarbon solvent.

21. A component as in claim 19 wherein the component is obtained by carrying out at least in part simultaneously the steps of treating a ferrous chloride support with at least one organic electron donor and milling.

22. The component as in claim 19 wherein the ferrous chloride support is obtained by reducing ferric chloride.

23. The component as in claim 19 wherein the ferrous chloride support is substantially anhydrous.

24. The component as in claim 19 wherein the organic electron donor is in the form of a complex with a titanium compound containing halogen.

25. The component of claims 19 or 24 wherein the electron donor is an aromatic carboxylic ester.

26. The component of claim 19 wherein the milling is carried out in the presence of a pulverization aid.

27. The component of claim 26 wherein the pulverization aid is a polysiloxane.

28. The component of claim 19 wherein the organometallic compound is an organoaluminum compound.

29. The component of claim 22 wherein the reducing agent for reducing ferric chloride to ferrous chloride is an organoaluminum compound.

30. The component of claim 22 wherein one of the electron donors is an alcohol.

31. The component of claim 22 wherein one of the electron donors is ethyl benzoate and another is butanol.

32. The component of claim 22 wherein the liquid titanium compound containing halogen of the post-treatment step is titanium tetrachloride.

33. The component of claim 22 wherein the post-treatment step is carried out in the presence of an inert hydrocarbon or halohydrocarbon solvent.

34. The component of claim 33 wherein the inert hydrocarbon or halohydrocarbon solvent contains a compound selected from the group consisting of benzene, toluene, xylene, chlorobenzene, or their mixtures.

35. The component of claims 19 or 20 wherein the post-treatment step is carried out at a temperature from about 60° C. to about 145° C.

36. The component of claims 19, 20, or 21 wherein the milling step is carried out in two or more stages.

37. A process for producing a component containing titanium of a catalytic system for polymerizing olefins comprising the steps of:
treating a ferrous chloride support with at least one organic electron donor to form an adduct,
milling the ferrous chloride, and
post-treating the milled ferrous chloride adduct with a liquid titanium compound containing halogen.

38. The process of claim 37 wherein the component is obtained by the additional step of treating the ferrous chloride support with a hydrocarbon solvent.

39. The process of claim 37 wherein the component is obtained by carrying out at least in part simultaneously the steps of treating a ferrous chloride.

40. The process of claim 37 wherein the ferrous chloride support is obtained by reducing ferric chloride.

41. The process of claim 37 wherein the ferrous chloride support is substantially anhydrous.

42. The process of claim 37 wherein the organic electron donor is in the form of a complex with a titanium compound containing halogen.

43. The process of claims 37 or 42 wherein the electron donor is an aromatic carboxylic ester.

44. The process of claim 37 wherein the milling is carried out in the presence of a pulverization aid.

45. The process of claim 44 wherein the pulverization aid is a polysiloxane.

46. The process of claim 37 wherein the organometallic compound is an organoaluminum compound.

47. The process of claim 41 wherein the reducing agent for reducing ferric chloride to ferrous chloride is an organoaluminum compound.

48. The process of claim 37 wherein one of the electron donors is an alcohol.

49. The process of claim 37 wherein one of the electron donors is ethyl benzoate and another is butanol.

50. The process of claim 37 wherein the liquid titanium compound containing halogen of the post-treatment step is titanium tetrachloride.

51. The process of claim 37 wherein the post-treatment step is carried out in the presence of an inert hydrocarbon or halohydrocarbon solvent.

52. The process of claim 51 wherein the inert hydrocarbon or halohydrocarbon solvent contains a compound selected from the group consisting of benzene, toluene, xylene, chlorobenzene, or their mixtures.

53. The process of claims 37 or 38 wherein the post-treatment step is carried out at a temperature from about 60° C. to about 145° C.

54. The process of claims 37, 38, or 39 wherein the milling step is carried out in two or more stages.

55. A catalytic component for the polymerization of olefins comprising a ferrous chloride support treated with an organic electron donor and having dispersed therein a catalytically effective amount of a tetravalent compound of titanium containing halogen.

56. The catalytic component of claim 55 wherein the halogen is chloride.

57. The catalytic component of claim 55 wherein the amount of titanium is from about 1 to about 15 percent by weight.

58. The catalytic component of claim 55 wherein the amount of titanium is from about 2 to about 5 percent by weight.

* * * * *